United States Patent
Aoki

(10) Patent No.: US 11,734,446 B2
(45) Date of Patent: Aug. 22, 2023

(54) SECRET DISTRIBUTION SYSTEM AND SECRET DISTRIBUTION METHOD OF FILES

(71) Applicants: GYOTOKUSHIKO CO., LTD., Chiba (JP); TECHNICAL INFRASTRUCTURE LOGIC CORPORATION, Tokyo (JP)

(72) Inventor: Masahiro Aoki, Tokyo (JP)

(73) Assignees: GYOTOKUSHIKO CO., LTD., Chiba (JP); TECHNICAL INFRASTRUCTURE LOGIC CORPORATION, Tokyo (JP)

( * ) Notice: Subject to any disclaimer, the term of this patent is extended or adjusted under 35 U.S.C. 154(b) by 250 days.

(21) Appl. No.: 17/268,659

(22) PCT Filed: Jul. 11, 2019

(86) PCT No.: PCT/JP2019/027583
§ 371 (c)(1),
(2) Date: Feb. 16, 2021

(87) PCT Pub. No.: WO2020/036024
PCT Pub. Date: Feb. 20, 2020

(65) Prior Publication Data
US 2021/0173958 A1    Jun. 10, 2021

(30) Foreign Application Priority Data

Aug. 16, 2018    (JP) .................................. 2018-153271

(51) Int. Cl.
*G06F 21/62* (2013.01)
*H04L 9/40* (2022.01)
*H04L 67/06* (2022.01)

(52) U.S. Cl.
CPC ...... *G06F 21/6227* (2013.01); *H04L 63/0838* (2013.01); *H04L 63/0846* (2013.01); *G06F 2221/2107* (2013.01); *H04L 67/06* (2013.01)

(58) Field of Classification Search
CPC ......... G06F 21/6227; G06F 2221/2107; G06F 21/6254; G06F 21/606; G06F 21/62;
(Continued)

(56) References Cited

U.S. PATENT DOCUMENTS 6,772,337 B1 *   8/2004   Yener .................. H04L 67/1001
                                                            380/279
9,442,671 B1 *   9/2016   Zhang .................. G06F 3/0635
(Continued)

FOREIGN PATENT DOCUMENTS

JP      2004147218 A      5/2004
JP      2006048158 A      2/2006
(Continued)

OTHER PUBLICATIONS

International Search Report dated Nov. 19, 2019 for PCT/JP2019/027583.

*Primary Examiner* — J. Brant Murphy
(74) *Attorney, Agent, or Firm* — Schmeiser, Olsen & Watts, LLP

(57) ABSTRACT

A method for causing sending and receiving of an encrypted file between a sending user terminal and a receiving user terminal connected via a network to be performed in a secret state via a management server is provided. The sending user terminal encrypts an original file and then fragments the original file into a plurality of divided files, creates a plurality of combined files formed by combining a plurality of the divided files, and distributes and saves the combined files to which restoration information for opening the combines files has been added in a plurality of online storages. The receiving user terminal can open the combined files obtained from the online storages by using the restoration information received from the management server to extract the divided files included in the combined files, and can restore the original file from the divided files.

11 Claims, 5 Drawing Sheets

(58) Field of Classification Search
CPC .............. G06F 21/46; G06F 21/602; G06F 2221/0748; H04L 63/0838; H04L 63/0846; H04L 67/06; H04L 9/0863; H04L 9/0894; H04L 67/1097; H04L 63/0428; G09C 1/00

See application file for complete search history.

(56) References Cited

U.S. PATENT DOCUMENTS

| | | | |
|---|---|---|---|
| 10,430,350 B1* | 10/2019 | Nimry | G06F 21/6218 |
| 2003/0084020 A1* | 5/2003 | Shu | H04L 9/40 |
| 2004/0049700 A1* | 3/2004 | Yoshida | H04L 63/04 |
| | | | 714/E11.125 |
| 2004/0133606 A1* | 7/2004 | Miloushev | H04L 67/1095 |
| 2004/0133650 A1* | 7/2004 | Miloushev | H04L 69/22 |
| | | | 709/213 |
| 2004/0133652 A1* | 7/2004 | Miloushev | H04L 67/1019 |
| | | | 707/999.009 |
| 2013/0275386 A1* | 10/2013 | Shin | G06F 16/134 |
| | | | 707/667 |
| 2016/0011939 A1* | 1/2016 | Luby | G06F 3/067 |
| | | | 714/764 |
| 2016/0306711 A1* | 10/2016 | Littlefield | G06F 16/1827 |
| 2017/0104736 A1* | 4/2017 | Seul | H04L 63/0428 |

FOREIGN PATENT DOCUMENTS

| | | | |
|---|---|---|---|
| JP | 2008139996 A | 6/2008 | |
| JP | 6322763 B1 | 5/2018 | |
| JP | 2019049914 A | 3/2019 | |

\* cited by examiner

SECRET DISTRIBUTION SYSTEM AND SECRET DISTRIBUTION METHOD OF FILES

CROSS-REFERENCE TO RELATED APPLICATIONS

This application claims priority to PCT Application No. PCT/JP2019/027583, having a filing date of Jul. 11, 2019, based off of Japanese Application No. 2018-153271, having a filing date of Aug. 16, 2018, the entire contents of which are hereby incorporated by reference.

FIELD OF TECHNOLOGY

The following relates to a secret distribution system and a secret distribution method of files, and more particularly, relates to a secret distribution system and a secret distribution method of files for encrypting files recorded on a recording medium, and safely managing, monitoring, and validating/invalidating the files.

BACKGROUND

Conventionally, when data such as a file is sent through a public network such as the Internet (hereinafter simply referred to as "the Internet"), the data is encrypted and sent by being attached to an E-mail, or the data is sent by using a VPN (Virtual Private Network). However, in the cases of these methods, the data is intercepted on a communication path, and when key information or a password is decrypted, the data will be decoded and leaked.

The secret distribution method is known as a method for addressing such security weaknesses. The secret distribution method is a technology that divides data to be kept secret into a plurality of fragment data, and prevents the original data from being restored unless all or equal to or more than a certain number of these fragment data is collected.

As for the secret distribution method, Japanese Patent Laid-Open No. 2008-139996 discloses a system in which an information terminal creates a plurality of share files by using a secret distribution technology, and saves one of the share files in a mobile communication terminal or a management server.

For example, when using an application to which the secret distribution method is applied, a sender can divide a transmission file into a plurality of fragment data. Additionally, the sender can attach and send each fragment file to a different E-mail. A recipient can obtain the original transmission file by collecting fragment files attached to a plurality of E-mails in the same folder, and executing any of the fragment files in an executable file format.

However, in the file transmission method as described above, not only the user's effort is increased, but also safety will be reduced since the fragment files are placed on the same mail server. Although the user can change the address of an E-mail to which each fragment file is attached, or can send each fragment file with a different transmission method, such a work requires a lot of effort, and compromises the convenience. Additionally, since it becomes easy for the sender and the recipient to make mistakes in communication about the restoration method of a file, there is also a possibility that the recipient fails in restoration of the file.

In view of such circumstances, embodiments of the invention described in Japanese Patent No. 6322763) suggests a data transfer method in a data transfer system with improved safety and convenience. This includes a sender system, a recipient system, and a management system that manages the data transfer via a network between the sender system and the recipient system.

This method includes the following steps.

The sender system divides original data into a plurality of fragment data by utilizing a secret distribution method, selects a transmission path for each fragment data, sends each fragment data to each selected transmission path, and sends information on each transmission path to the management system.

The management system receives the information on each transmission path from the sender system, and sends the received information on each transmission path to the recipient system.

The recipient system receives the information on each transmission path from the management system, receives each fragment data from each transmission path based on the received information on each transmission path, and restores each received fragment data into the original data by utilizing the secret distribution method.

According to embodiments of the invention described in Japanese Patent No. 6322763 having the above-described configuration, it is said to be able to provide a data transfer mechanism with improved safety and convenience. However, in the method according to embodiments of the invention, since files in a terminal (sender system) are deleted by transmitting information to the Internet or the like with an application downloaded to the terminal, in an environment that is not connected to a network and in a case where the files are moved to an indefinite location due to backup or the like, the problem occurs that deleted data cannot be effectively restored.

An aspect of embodiments of the present invention is to provide secret distribution system and method of files that can maintain sufficient confidentiality by complicating restoration of the files, and that can restore original files by using the remaining files, and can secure business continuity, even when a part of the files disappears at the time of a hardware failure, a disaster, and the like.

SUMMARY

An aspect relates to a system for causing sending and receiving of an encrypted file between a sending user terminal and a receiving user terminal connected via a network to be performed in a secret state via a management server, the sending user terminal comprising a function of encrypting an original file and then fragmenting the original file into a plurality of divided files, and setting a threshold value for a number of the divided files required for restoration of the original file, and a function of creating a plurality of combined files formed by combining a plurality of the divided files, adding restoration information required for opening the combined files to the combined files, and distributing and saving the combined files to which the restoration information has been added in a plurality of online storages, the management server comprising a function of maintaining/managing the restoration information sent from the sending user terminal, and sending the restoration information to the receiving user terminal when a query for the restoration information of the combined files is received from the receiving user terminal with an access right, and the receiving user terminal being able to open the combined files obtained from the online storages, by using the restoration information received from the management server, and being able to restore the original file when a number of the divided files obtained by opening is equal to or more than the threshold value for the divided files included in the restoration information.

In one embodiment, the sending user terminal and the receiving user terminal includes a communication unit, an encryption/decryption unit for encrypting/decoding the files, a file information management unit that divides the encrypted original file, and creates a plurality of combined files formed by combining a plurality of the divided files, and manages arrangement information of each of the combined files when distributing the combined files to the plurality of online storages, and a distribution file input/output unit that distributes the combined files to the plurality of online storages, and the management server includes a user interface unit, a communication unit, a user management unit that saves various kinds of parameters used by the system in its own terminal, and reads and manages the various kinds of parameters, an opening management unit that sends and receives data through the communication units of the sending user terminal and the receiving user terminal, and controls opening of the combined files based on the data, a file information management unit that provides creation/opening information of the combined files at the time of creation/opening of the combined files to the opening management unit, and manages information that is set by the sending user terminal and the receiving user terminal, a management parameter generating unit that provides a function of generating various kinds of data from internal operation data, and a log generating unit that provides a function of generating an operation log and saving the operation log in a database.

In one embodiment, the threshold value for the number of the divided files required for restoration of the original file is set in advance in the file information management unit of the sending user terminal, and is managed in the file information management unit of the management server. Additionally, the management server includes a one-time password generating unit that creates a time-limited one-time password that is used in a case where opening is performed when the Internet is not connected, and the sending user terminal and the receiving user terminal include a one-time password analyzing unit for analyzing the one-time password.

In one embodiment, the restoration information added to the combined files includes an access right, a deadline for opening, and the threshold value for the divided files. Additionally, an application for opening the combined files is any of the self-extracting type, the disk configuration browsing software type, and the virtual disk mount type.

In order to achieve the above-described aspect, embodiments of the invention are a secret distribution method of files for causing sending and receiving of an encrypted file between a sending user terminal and a receiving user terminal connected via a network to be performed in a secret state via a management server, the method causing the sending user terminal to include a function of encrypting an original file and then fragmenting the original file into a plurality of divided files, and setting a threshold value for a number of the divided files required for restoration of the original file, and a function of creating a plurality of combined files formed by combining a plurality of the divided files, adding restoration information required for opening the combined files to the combined files, and distributing and saving the combined files to which the restoration information has been added in a plurality of online storages, and the method causing the management server to include a function of maintaining/managing the restoration information sent from the sending user terminal, and sending the restoration information to the receiving user terminal when a query for the restoration information of the combined files is received from the receiving user terminal with an access right, wherein the receiving user terminal can open the combined files obtained from the online storages, by using the restoration information received from the management server to extract the divided files included in the combined files, and can restore the original file from the divided files, a number of the divided files being equal to or more than the threshold value.

Additionally, in order to achieve the above-described aspect, embodiments of the invention are a secret distribution method of files for causing sending and receiving of an encrypted file between a sending user terminal and a receiving user terminal connected via a network to be performed in a secret state via a management server, the method comprising:

an original file encryption/dividing step of encrypting, in the sending user terminal, an original file and then fragmenting the original file into a plurality of divided files, and setting a threshold value for a number of the divided files required for restoration of the original file;

a combined file creation step of creating, in the sending user terminal, a plurality of combined files formed by combining a plurality of the divided files;

a restoration information creation step of creating, in the sending user terminal, restoration information required for opening the combined files, and adding the restoration information to the combined files;

an online storage distribution/saving step of distributing and saving, by the sending user terminal, the plurality of combined files to which the restoration information has been added in respective different online storages; and a restoration information saving step of maintaining/managing, in the management server, the restoration information sent from the sending user terminal, wherein, when there is a query for the restoration information of the combined files to the management server from the receiving user terminal with an access right, the restoration information is sent to the receiving user terminal from the management server, and the receiving user terminal opens the combined files obtained from the online storages by using the restoration information to extract the divided files, and can restore the original file from the divided files, a number of the divided files being equal to or more than the threshold value.

In one embodiment of the above-described secret distribution method of files, the restoration information added to the combined files includes an access right, a deadline for opening, and the threshold value for the divided files. In addition, an application for opening the combined files is any of the self-extracting type, the disk configuration browsing software type, and the virtual disk mount type. Additionally, a variable-length gap is embedded between the combined files and the application for opening.

Since the secret distribution system and method of files according to embodiments of the present invention are as described above, there are effects that, since the restoration of files is complicated, sufficient confidentiality can be maintained, and since combined files are distributed and saved in online storages in a secret state, original files can be restored by using the remaining files, and business continuity can be secured, even when a part of the files disappears at the time of a hardware failure, a disaster, and the like.

BRIEF DESCRIPTION

Some of the embodiments will be described in detail, with reference to the following figures, wherein like designations denote like members, wherein.

Figure 4:
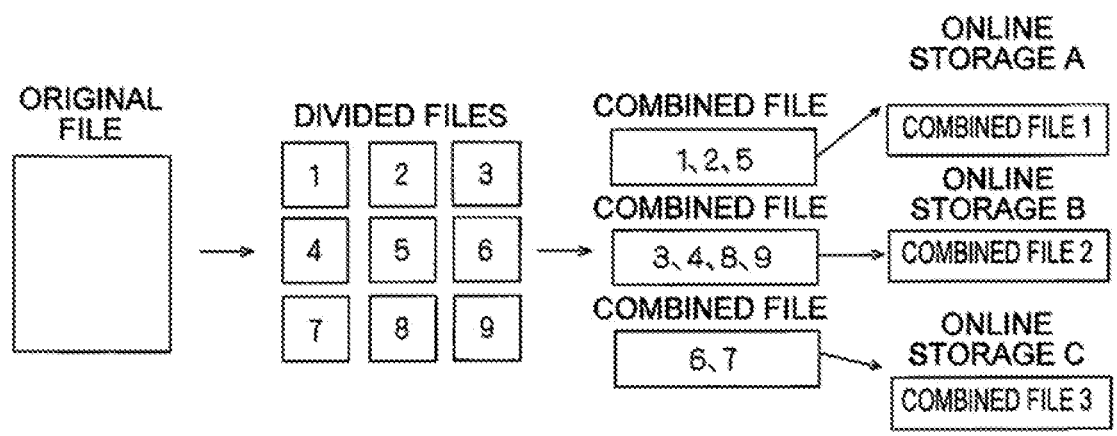
Figure 5:
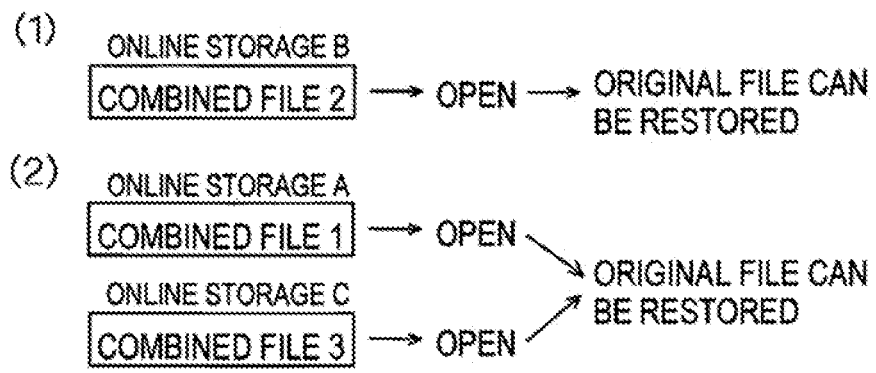
Figure 5:
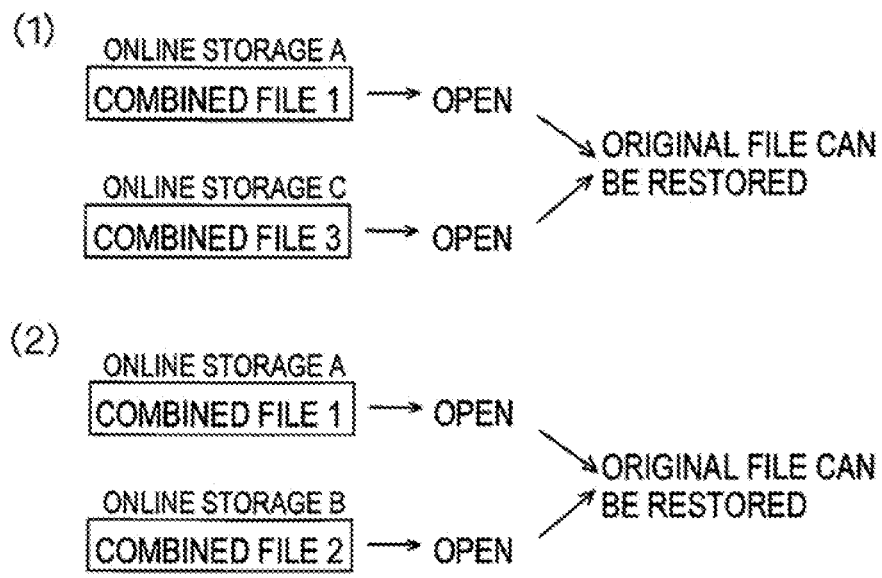

FIG. 4 is a diagram for describing the processing from an original file encryption/dividing step to an online storage distribution/saving step in the secret distribution method of files according to embodiments of the present invention; and FIG. 5 is a diagram for describing a restoration method of an original file in the secret distribution method of files according to embodiments of the present invention.

DETAILED DESCRIPTION

Figure 1:
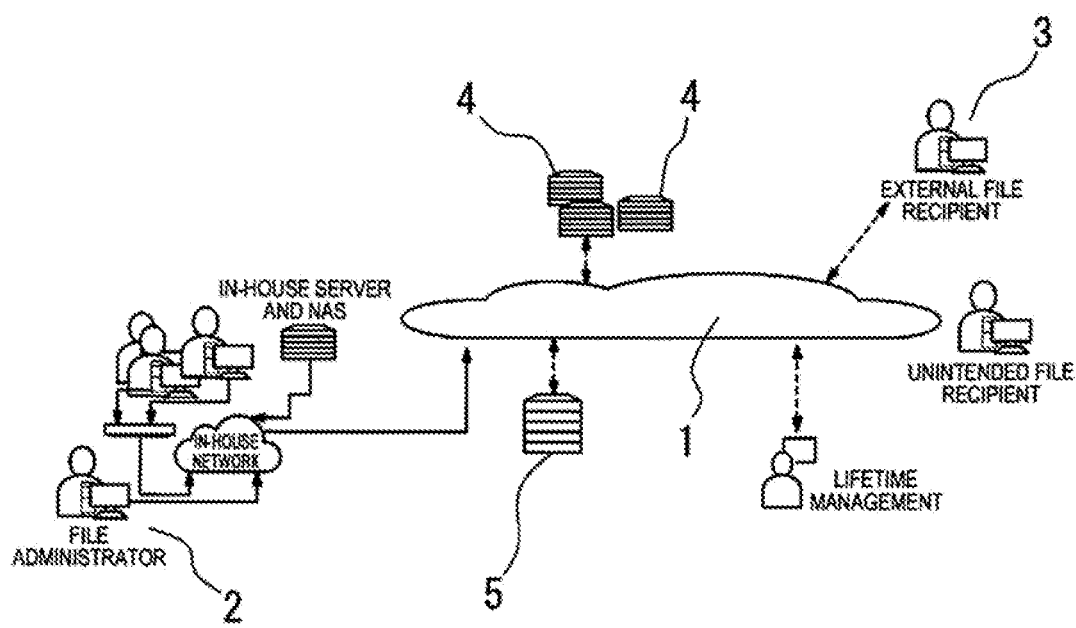
FIG. 1 is a schematic configuration diagram of a secret distribution system of files according to embodiments of the present invention.

Modes for implementing embodiments of the present invention will be described in detail with reference to the drawings. As shown in FIG. 1, a secret distribution system of files according to embodiments of the present invention is constituted by a sending user terminal 2 and a receiving user terminal 3 that send and receive encrypted files via a network 1, a plurality of online storages 4 that save the encrypted files to be sent and received, and a management server 5. The management server 5 maintains the restoration information of the encrypted files, provides a user interface for setting/editing the access right to and the deadline for opening the encrypted files, and maintains/manages the restoration information of the set encrypted files.

The receiving user terminal 3 is a terminal handled by one or more users (hereinafter referred to as a "public user") that are specified by an administrator of the sending user terminal 2, and to whom access rights are granted. There are a case where the public user is an individual and a case where the public user is a group.

Figure 2:
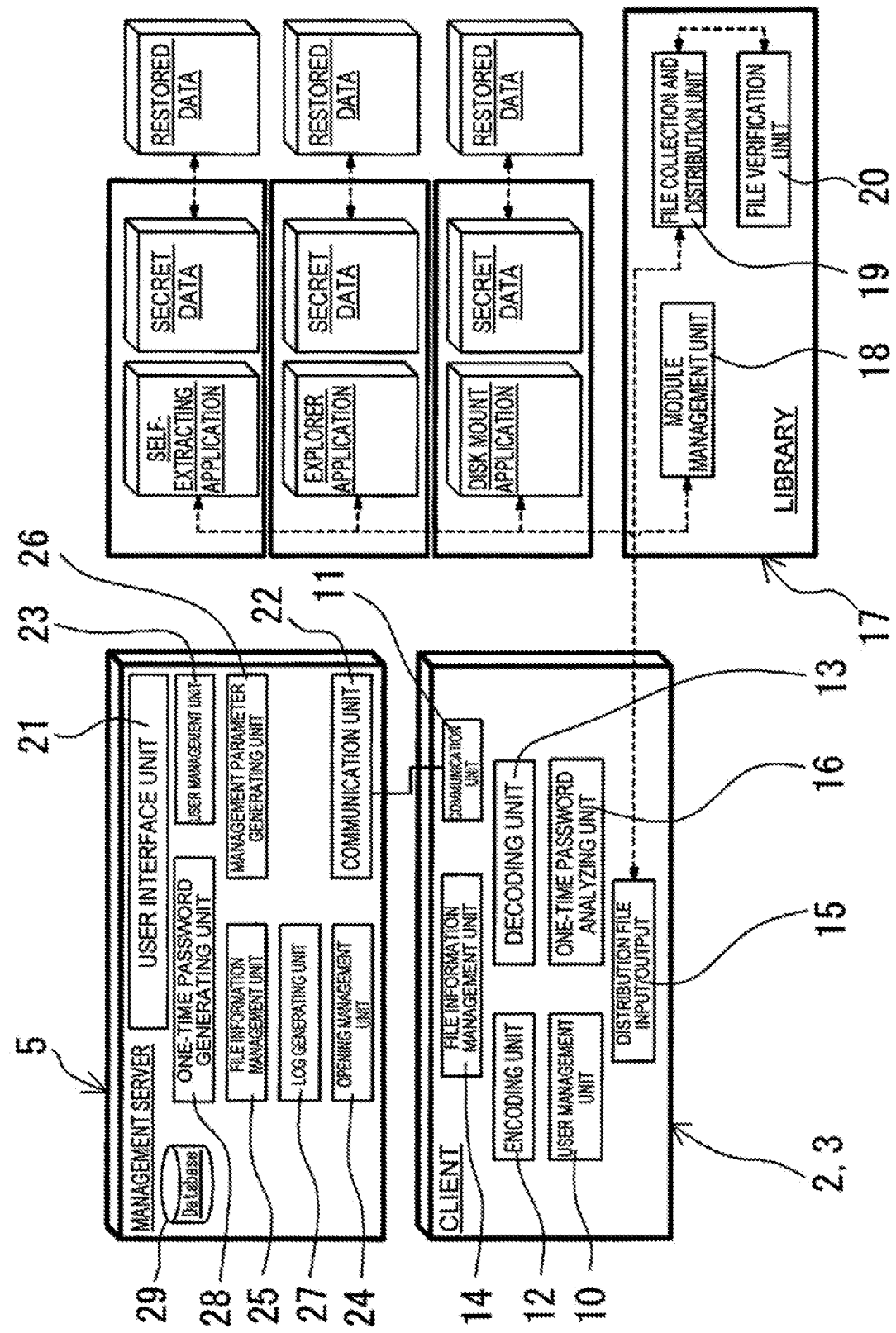
FIG. 2 is a schematic block diagram of the secret distribution system of files according to embodiments of the present invention.

In the sending user terminal 2 and the receiving user terminal 3, as shown in FIG. 2, a client application in an executable format is installed for constituting each of the modules of a communication unit 11 for performing communication with the management servers 5 described later, an encoding unit 12 for encrypting files, a decoding unit 13 for decoding files, a file information management unit 14, and a distribution file input/output unit 15. The file information management unit 14 generates a plurality of combined files formed by combining a plurality of divided files that are obtained by dividing and fragmenting the encrypted original file, and manages the arrangement information, check sum, and the like of each combined file at the time of distributing the combined files. The distribution file input/output unit 15 distributes the combined files supplied from the file information management unit 14 to a plurality of online storages 4.

This client application further constitutes a library 17 including a module management unit 18 that checks whether or not the modules used in each application are correct, a file collection and distribution unit 19 that obtains data in a format required in each application from the distribution file input/output unit 15, and a file verification unit 20 that verifies the integrity of the data obtained by the file collection and distribution unit 19. This library 17 is created as a group of functions called by each application in each module constituting the client application.

The management server 5 realizes a user authentication function of registering the file information sent from the client application (the sending user terminal 2), and publishing the registration information only to a specified public user. The management server 5 includes a user interface unit 21 that provides a setting change screen for the user to set/change the access right, the deadline for opening, and the like, and a display screen for viewing opening records, a communication unit 22 for performing communication between the communication units 11 of the sending user terminal 2 and the receiving user terminal 3, and a user management unit 23 that saves various kinds of parameters used by the present system in its own terminal, and reads and manages the various kinds of parameters. The parameters here include an ID for accessing the management server 5, the MAC address of a terminal, public user information, information of grouped users, and the like.

The management server 5 also includes an opening management unit 24 that sends and receives data through the communication units 11 of the sending user terminal 2 and the receiving user terminal 3, and controls the opening of a file based on the data, and a file information management unit 25 that provides the creation/opening information of a file to the opening management unit 24 at the time of creation/opening of the file, and manages the information that is set by the sending user terminal 2 and the receiving user terminal 3. And further, it is configured by including a management parameter generating unit 26 that is a generator for generating various kinds of data, and a log generating unit 27 that provides a function of generating an operation log and saving the operation log in a database 29.

When a combined file can be divided by using the data of the file information management unit 25, the opening management unit 24 divides the combined file, and confirms whether or not the combined file satisfies a threshold value. Additionally, the management parameter generating unit 26 generates internal information for restoring a file, such as the number of bytes of a gap assigned for dividing data (as described later, a variable-length gap is embedded between a combined file and a program for restoration), and the threshold value. Further, the file information management unit 25 sends, to the opening management unit 24, the information of individual divided files and a combined file that collects them, the number of divided files, the number of combined files, the information of a storage for saving, and all the other information of the files to be generated.

Although the present system assumes an Internet connection, it is to make it possible to open even when the Internet is not connected. Therefore, the management server 5 includes a one-time password generating unit 28 that creates a time-limited one-time password that is used in a case where opening is performed when the Internet is not connected. Additionally, the sending user terminal 2 and the receiving user terminal 3 include a one-time password analyzing unit 16 for analyzing this one-time password. In this manner, when the Internet is not connected, it becomes possible to restore data by reading and analyzing this one-time password by the one-time password analyzing unit 16.

The restoration information including at least the access right (public user) and the deadline for opening is added to each combined file generated in the file information management unit 14. There may be a plurality of public users, and there are a case where the public user is one individual and a case where the public user is a group. As describe later, this restoration information is saved and managed in the management server 5, and the public user to whom the access right is granted queries the management server 5 for this restoration information, and this restoration information is supplied from the management server 5 after user authentication. The public user who obtains this restoration information can restore an original file by collecting the divided files included in the combined files obtained from the online storages 4 with the use of the restoration information, the number of the divided files being equal to or more than the threshold value.

An application for opening a combined file is any of the self-extracting type, the disk configuration browsing software type, and the virtual disk mount type, and is added to each combined file. In the case of the self-extracting type, a combined file is arranged in a single format, and is automatically opened alone by self-extraction at the time of opening. In this case, a query to the management server 5 is performed, the access right and the opened date are confirmed, and when it can be opened, it is returned to the original divided file, and is decoded in the decoding unit 13 based on the restoration information received from the management server 5. Note that, in the case of this self-extracting type, although a file may not be able to be attached to an email since the file is in an executable form, the file is for sending and receiving via company-wide sharing and via a medium such as a USB memory stick.

In the case of the disk configuration browsing software type, a file is encrypted and decoded by an Explorer-style application on an OS. In this case, the attribute and more of the file can be displayed in a file browsing application format. Divided files are collected at the time of restoration, and an original file is restored.

In the case of the virtual disk mount type, files in the VHD format of the virtual disk file format and in an extension format are mounted, and conversion of data is automatically performed at the time of writing to and reading from a disk on an OS. In this case, similar to mounting a virtual disk, it is provided to a system as a drive.

In this manner, any of the self-extracting type, the disk configuration browsing type, and the virtual disk mount type is used as an application for opening a combined file, and a program thereof is added to the combined file, and in that case, a variable-length gap is embedded between the combined file and a restoration program of the self-extraction or the like, and the so-called garbage data is inserted. By doing so, it becomes much more difficult to estimate a data portion from a plurality of combined files.

The secret distribution method of files according to embodiments of the present invention encrypts an original file and then fragments the original file into a plurality of divided files, sets a threshold value for the number of divided files required for the restoration of the original file, creates a plurality of combined files formed by combining a plurality of the divided files, adds the restoration information for opening the combined files to the combined files, and distributes and saves the combined files to which the restoration information has been added in a plurality of online storages. Additionally, it is characterized in that, when a person with an access right obtains the restoration information, the original file can be restored from the divided files extracted by opening the combined files obtained from the online storages, the number of the divided files being equal to or more than the threshold value. This secret distribution method of files can be performed by utilizing the above-described secret distribution system of files according to embodiments of the present invention.

Figure 3:
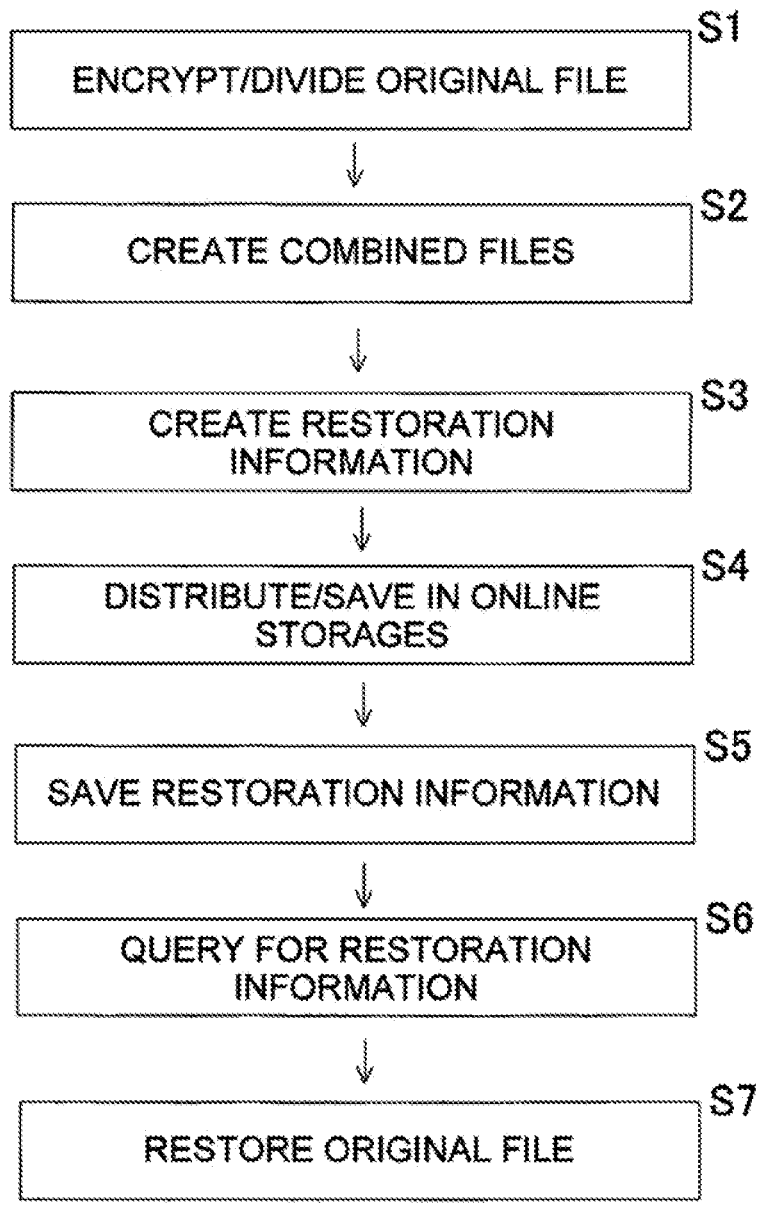
FIG. 3 is a flow diagram showing the processing flow in a secret distribution method of files according to embodiments of the present invention.

That is, the secret distribution method of files utilizing the above-described system includes the following steps, as shown in the flow diagram of FIG. 3.

an original file encryption/dividing step (S1) of encrypting, in the sending user terminal 2, an original file and then fragmenting the original file into a plurality of divided files, and setting a threshold value for the number of the divided files required for the restoration of the original file a combined file creation step (S2) of creating, in the sending user terminal 2, a plurality of combined files formed by combining a plurality of the divided files a restoration information creation step (S3) of creating, in the sending user terminal 2, restoration information required for opening the combined files and adding the restoration information to each of the combined files an online storage distribution/saving step (S4) of distributing and saving the plurality of combined files to which the restoration information has been added in respective different online storages 4 by the sending user terminal 2 a restoration information saving step (S5) of maintaining/managing the restoration information in the management server 5 a step (S6) of querying the management server 5 for the restoration information of the combined files by the receiving user terminal 3 a step (S7) of opening the combined files obtained from the online storage 4 by using the restoration information obtained from the management server after user authentication, and restoring the original file from the collected divided files, the number of the divided files being equal to or more than the threshold value Hereinafter, the secret distribution method of files utilizing the system according to embodiments of the present invention will be described in detail for each step.

Original File Encryption/Dividing Step (S1)

This step is a step of encrypting, in the sending user terminal 2, an original file and then fragmenting the original file into a plurality of divided files. Encrypting a file and then fragmenting the file into a plurality of divided files in this manner is generally performed. In an example shown in FIG. 4, an original file is fragmented into nine divided files. At the time of this fragmentation, the threshold value for the number of divided files required for the restoration of the original file is set. As described later, it is not necessary to collect all the divided files in order to restore the original file, and it is sufficient to collect a predetermined number (threshold value) or more of the divided files.

Combined File Creation Step (S2)

This step is a step of creating, in the file information management unit 14 of the sending user terminal 2, a plurality of combined files formed by combining a plurality of the divided files. The format of the combined files is the ZIP file format or the virtual disk format. The combined file is formed by combining a plurality of divided files in an arbitrary combination, and three combined files are created in the example shown in FIG. 4. Additionally, a combined file 1 is the combination of the divided files 1, 2 and 5, and a combined file 2 is the combination of the divided files 3, 4, 8 and 9, and a combined file 3 is the combination of the divided files 6 and 7.

Restoration Information Creation Step (S3)

This step is a step of creating, in the file information management unit 14 of the sending user terminal 2, the restoration information required for the restoration of the combined files, and adding the restoration information to each of the combined files. The restoration information here is not the information for restoring the original file, but the information for opening the combined files, which is pre-processing for restoring the original file, includes at least an access right, i.e., a user name (public user name) and a deadline for opening that are specified by the administrator of the sending user terminal 2, and also includes a threshold value for the division files required for the restoration of the above-described original file, which is set for each public user. The creation of this restoration information is performed through the user interface provided by the user interface unit 21 of the management server 5. Note that the restoration information is not fixed, but can be changed at any time, and when a change is made, the saved data in the file information management unit 25 of the management server 5 described later is updated.

Online Storage Distribution/Saving Step (S4)

This step is a step of distributing and saving the plurality of combined files to which the restoration information has been added in the respective different online storages 4 via the distribution file input/output unit 15 from the file information management unit 14 of the sending user terminal 2. In the example shown in FIG. 4, the combined file 1 is saved in an online storage A, the combined file 2 is saved in an online storage B, and the combined file 3 is saved in an online storage C. Arrangement information about to which of the online storages 4 each of the distributed combined files is arranged, a check sum, and the like are managed in the file information management unit 14. Additionally, these items of information are simultaneously sent to and shared with the file information management unit 25 of the management server 5. Note that, although the combined files saved in each of the online storages 4 are not necessarily the same, but may be the same depending on the capacity, the distributed management operation, and the like.

Restoration Information Saving Step (S5)

This step is a step of maintaining/managing, in the file information management unit 25 of the management server 5, the restoration information sent from the file information management unit 14 of the sending user terminal 2, in order to correspond to queries from the public user described later.

Restoration Information Query step (S6)

This step is a step of querying the management server 5 for the restoration information of the combined files from the receiving user terminal 3 by the public user who wishes to restore the original file. When there is a query for the restoration information from the public user, checking of the access right and the like is performed in the opening management unit 24 of the management server 5, and when it is the public user with the access right and the like, the restoration information is sent to the receiving user terminal 3 of the public user. Additionally, whenever there is a query for the restoration information from the public user, a log is generated in the log generating unit 27 and is saved in the database 29, and the data is published according to a browsing request from a sending user terminal 1.

Original File Restoration Step (S7)

This step is a step of restoring, by the public user, the original file from the divided files obtained by opening and collecting the combined files obtained from the online storages 4, by using the restoration information sent from the management server 5, the number of the divided files being equal to or more than the threshold value. Although usually a plurality of the combined files are required for restoration to the original file, in the case of combined files including the divided files, the number of the divided files being equal to or more than the threshold value, the restoration can be performed with one combined file. In the example shown in FIG. 4, since the combined file 1 includes three divided files, the combined file 2 includes four divided files, and the combined file 3 includes two divided files, for example, when the threshold value number is 4, only the combined file 2 including the four divided files is sufficient, and when the threshold value number is 5, at least two combined files are required (refer to FIG. 5).

Whenever the public user opens a combined file, a log is generated in the log generating unit 27 and is registered in the database 29, and the user can refer to the opening record. Note that, although in a case where the number of divided files required for restoration of the original file is less than the threshold value, a plurality of the combined files are required, in that case, data is delivered by requesting the management server 5 for the other divided files and combined files, and thus a restoration process (original file restoration step (S7)) is performed. In embodiments of the present invention, in order to restore the original file in this manner, it is sufficient to collect the divided files, the number of the divided files being equal to or more than the threshold value that is set at the time of division, and this can be decoded in the decoding unit 13 by using the information for decoding the divided files sent from the management server 5.

The secret distribution system and method of files according to embodiments of the present invention have the above-described configurations, and can maintain sufficient confidentiality, since the restoration of a file is complicated. Additionally, since the combined files are distributed and saved in online storages in a secret state, there are effects that original files can be restored by using the remaining files, and can secure business continuity, even when a part of the files disappear at the time of a hardware failure, a disaster, and the like, and its industrial applicability is great.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A system for sending and receiving of an encrypted file between a sending user terminal and a receiving user terminal connected via a network to be performed in a secret state via a management server,
    wherein the sending user terminal comprises a function of encrypting an original file and then fragmenting the original file into a plurality of divided files, and setting a threshold value for a number of the plurality of divided files required for restoration of the original file, and a function of creating a plurality of combined files formed by combining the plurality of the divided files, adding restoration information required for opening the plurality of combined files to the plurality of combined files, and distributing and saving the plurality of combined files to which the restoration information has been added in a plurality of online storages, the management server comprises a function of maintaining and managing the restoration information sent from the sending user terminal, and sending the restoration information to the receiving user terminal when a query for the restoration information of the plurality of combined files is received from the receiving user terminal with an access right, and the receiving user terminal can open the plurality of combined files obtained from the online storages, by using the restoration information received from the management server, and can restore the original file when a number of the plurality of divided files collected by opening is equal to or more than the threshold value for the plurality of divided files.

2. The secret distribution system of files according to claim 1, wherein the sending user terminal and the receiving user terminal includes a communication unit, an encryption and decryption unit for encrypting and decrypting the files, a file information management unit that divides the encrypted original file, and creates a plurality of combined files formed by combining a plurality of the divided files, and manages arrangement information of each of the combined files when distributing the combined files to the plurality of online storages, and a distribution file input/output unit that distributes the combined files to the plurality of online storages, and the management server includes a user interface unit, a communication unit, a user management unit that saves various kinds of parameters used by the system in its own terminal, and reads and manages the various kinds of parameters, an opening management unit that sends and receives data through the communication units of the sending user terminal and the receiving user terminal, and controls opening of the combined files based on the data, a file information management unit that provides creating and opening information of the combined files at the time of creation and opening of the combined files to the opening management unit, and manages information that is set by the sending user terminal and the receiving user terminal, a management parameter generating unit that provides a function of generating various kinds of data from internal operation data, and a log generating unit that provides a function of generating an operation log and saving the operation log in a database.

3. The secret distribution system of files according to claim 2, wherein the threshold value for the number of the plurality of divided files required for restoration of the original file is set in advance in the file information management unit of the sending user terminal, and is managed in the file information management unit of the management server.

4. The secret distribution system of files according to claim 1, wherein the management server includes a one-time password generating unit that creates a time-limited one-time password that is used in a case where opening is performed when the Internet is not connected, and the sending user terminal and the receiving user terminal include a one-time password analyzing unit for analyzing the one-time password.

5. The secret distribution system of files according to claim 1, wherein the restoration information added to the plurality of combined files includes an access right, a deadline for opening, and the threshold value for the plurality of divided files.

6. The secret distribution system of files according to claim 1, wherein an application for opening the plurality of combined files is any of the self-extracting type, the disk configuration browsing software type, and the virtual disk mount type.

7. A secret distribution method of files for sending and receiving of an encrypted file between a sending user terminal and a receiving user terminal connected via a network to be performed in a secret state via a management server, the method causing the sending user terminal to include a function of encrypting an original file and then fragmenting the original file into a plurality of divided files, and setting a threshold value for a number of the plurality of divided files required for restoration of the original file, and a function of creating a plurality of combined files formed by combining the plurality of the divided files, adding restoration information required for opening the plurality of combined files to the plurality of combined files, and distributing and saving the plurality of combined files to which the restoration information has been added in a plurality of online storages, and the method causing the management server to include a function of maintaining and managing the restoration information sent from the sending user terminal, and sending the restoration information to the receiving user terminal when a query for the restoration information of the plurality of combined files is received from the receiving user terminal with an access right, wherein the receiving user terminal can open the plurality of combined files obtained from the online storages, by using the restoration information received from the management server to extract the plurality of divided files included in the plurality of combined files, and can restore the original file from the plurality of divided files, a number of the plurality of divided files being equal to or more than the threshold value.

8. A secret distribution method of files for sending and receiving of an encrypted file between a sending user terminal and a receiving user terminal connected via a network to be performed in a secret state via a management server, the method comprising:

encrypting an original file in the sending user terminal, and then fragmenting the original file into a plurality of divided files, and setting a threshold value for a number of the plurality of divided files required for restoration of the original file;

creating a plurality of combined files, in the sending user terminal, by combining the plurality of the divided files;

creating a restoration information, in the sending user terminal, the restoration information required for opening the plurality of combined files, and adding the restoration information to the plurality of combined files;

distributing and saving an online storage, by the sending user terminal, the plurality of combined files to which the restoration information has been added in respective different online storages; and maintaining and managing a restoration information saving, in the management server, the restoration information sent from the sending user terminal, wherein, when there is a query for the restoration information of the plurality of combined files to the management server from the receiving user terminal with an access right, the restoration information is sent to the receiving user terminal from the management server, and the receiving user terminal opens the plurality of combined files obtained from the online storages by using the restoration information to extract the plurality of divided files, and can restore the original file from the plurality of divided files, a number of the plurality of divided files being equal to or more than the threshold value.

9. The secret distribution method of files according to claim 7, wherein the restoration information added to the plurality of combined files includes an access right, a deadline for opening, and the threshold value for the plurality of divided files.

10. The secret distribution method of files according to claim 7, wherein an application for opening the plurality of combined files is any of the self-extracting type, the disk configuration browsing software type, and the virtual disk mount type.

11. The secret distribution method of files according to claim 10, wherein a variable-length gap is embedded between the plurality of combined files and the application for opening.

* * * * *